(12) United States Patent
Spartz et al.

(10) Patent No.: US 11,733,159 B2
(45) Date of Patent: *Aug. 22, 2023

(54) ANALYSIS SYSTEM AND METHOD EMPLOYING THERMAL DESORPTION AND SPECTROMETRIC ANALYSIS

(71) Applicant: MLS ACQ, INC., East Windsor, CT (US)

(72) Inventors: Martin L. Spartz, Ellington, CT (US); Charles M. Phillips, Sicklerville, NJ (US); Peter P. Behnke, Vernon, CT (US); Anthony S. Bonanno, Ellington, CT (US)

(73) Assignee: MLS ACQ, INC., East Windsor, CO (US)

( * ) Notice: Subject to any disclaimer, the term of this patent is extended or adjusted under 35 U.S.C. 154(b) by 17 days.

This patent is subject to a terminal disclaimer.

(21) Appl. No.: 17/528,414

(22) Filed: Nov. 17, 2021

(65) Prior Publication Data

US 2022/0074852 A1 Mar. 10, 2022

Related U.S. Application Data

(63) Continuation of application No. 16/306,291, filed as application No. PCT/US2017/035685 on Jun. 2, 2017, now Pat. No. 11,181,471.

(Continued)

(51) Int. Cl.
*G01N 21/3504* (2014.01)
*G01N 1/40* (2006.01)
(Continued)

(52) U.S. Cl.
CPC ......... *G01N 21/3504* (2013.01); *G01N 1/405* (2013.01); *G01N 30/00* (2013.01);
(Continued)

(58) Field of Classification Search
CPC .... G01N 21/3504; G01N 1/405; G01N 30/00; G01N 30/74; G01N 2021/3595; G01N 2030/008; G01N 2030/743
See application file for complete search history.

(56) References Cited

U.S. PATENT DOCUMENTS

| 4,698,071 A | 10/1987 | Elias |
| 5,065,614 A | 11/1991 | Hartman et al. |

(Continued)

FOREIGN PATENT DOCUMENTS

WO    WO 01/55714    8/2001

OTHER PUBLICATIONS

International Search Report and Written Opinion of the International Searching Authority, dated Sep. 14, 2017, from International Application No. PCT/US2017/035685, filed on Jun. 2, 2017. 14 pages.

(Continued)

*Primary Examiner* — David P Porta
*Assistant Examiner* — Casey Bryant
(74) *Attorney, Agent, or Firm* — Michael Best & Friedrich LLP

(57) ABSTRACT

Components resolved in time by a thermal desorption separator accumulate in a sample cell and are analyzed by electromagnetic radiation-based spectroscopic techniques.

27 Claims, 4 Drawing Sheets

Related U.S. Application Data

(60) Provisional application No. 62/344,630, filed on Jun. 2, 2016.

(51) Int. Cl.
  G01N 30/00 (2006.01)
  G01N 30/74 (2006.01)
  G01N 21/35 (2014.01)

(52) U.S. Cl.
  CPC ..... *G01N 30/74* (2013.01); *G01N 2021/3595* (2013.01); *G01N 2030/008* (2013.01); *G01N 2030/743* (2013.01)

(56) References Cited

U.S. PATENT DOCUMENTS

| | | | |
|---|---|---|---|
| 6,947,132 B1* | 9/2005 | Boss | G01N 21/658 |
| | | | 356/301 |
| 7,253,413 B2 | 8/2007 | Sauer et al. | |
| 9,606,088 B2* | 3/2017 | Spartz | G01N 21/3504 |
| 2007/0266858 A1 | 11/2007 | Alm et al. | |
| 2013/0299688 A1 | 11/2013 | Balogh et al. | |
| 2015/0260695 A1* | 9/2015 | Spartz | G01N 30/8641 |
| | | | 250/339.01 |
| 2016/0132617 A1 | 5/2016 | Liu et al. | |
| 2016/0363569 A1* | 12/2016 | Walsh | G01N 33/2835 |

OTHER PUBLICATIONS

International Preliminary Report on Patentability dated Dec. 13, 2018, from International Application No. PCT/US2017/035685, filed on Jun. 2, 2017. 8 pages.

* cited by examiner

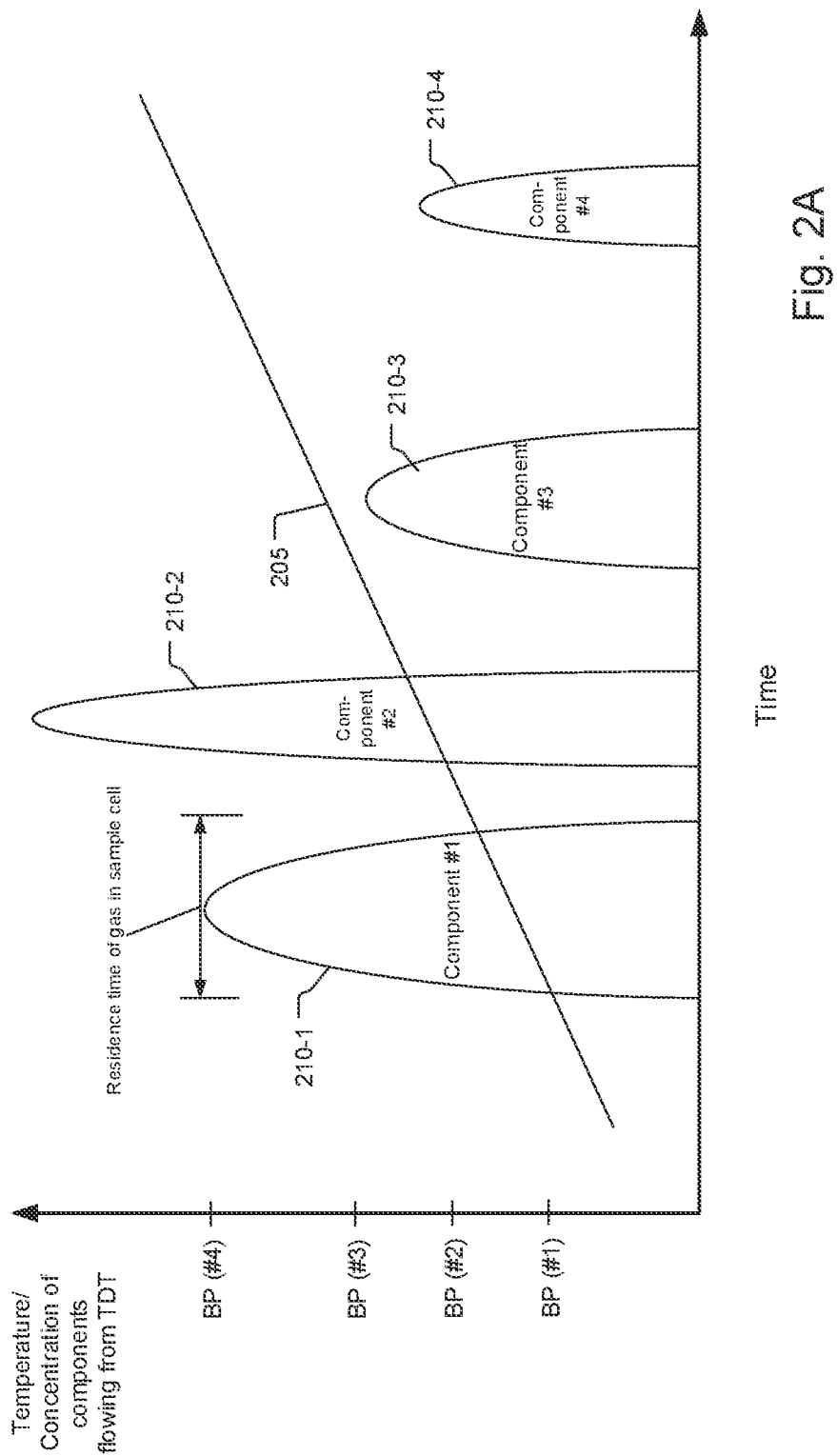

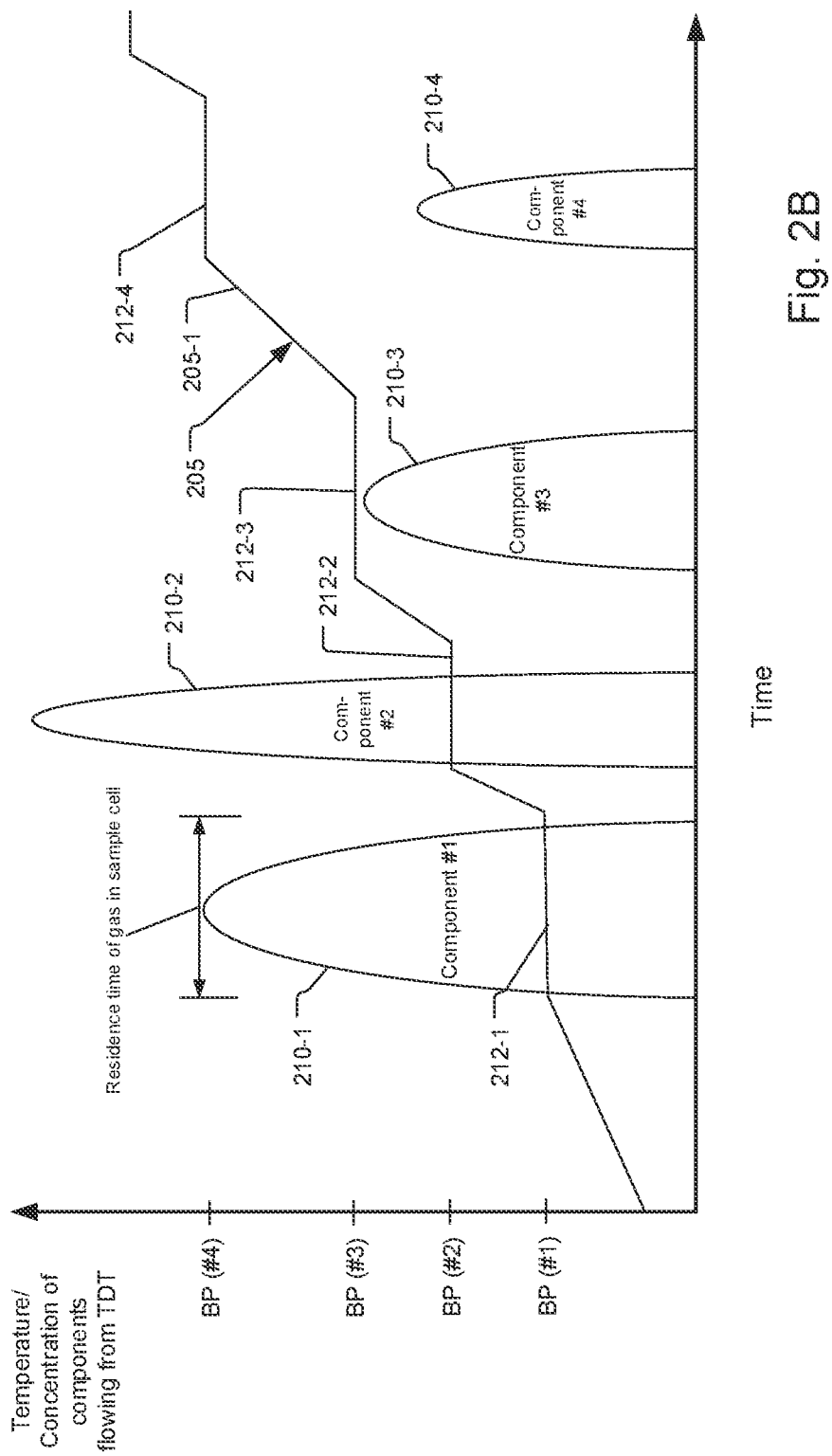

ANALYSIS SYSTEM AND METHOD EMPLOYING THERMAL DESORPTION AND SPECTROMETRIC ANALYSIS

RELATED APPLICATIONS

This application is a Continuation of U.S. patent application Ser. No. 16/306,291, filed on Nov. 30, 2018, which is a § 371 National Phase Application of International Application No. PCT/US2017/035685, filed on Jun. 2, 2017, which claims the benefit under 35 USC 119(e) of U.S. Provisional Application No. 62/344,630, filed on Jun. 2, 2016, all of which are incorporated herein by reference in their entirety.

BACKGROUND OF THE INVENTION

Gas Chromatography (GC) is used to resolve a mixture into its various components according to retention profiles of the different molecules passing through the GC column.

While the technique can separate mixtures containing hundreds of substances, identifying the molecules that elute from the column is more problematic. To address the need for rapid and sensitive identification of the molecular species present, GC has been integrated with techniques such as mass spectrometry (MS) or Fourier transform infrared (FTIR) spectrometry.

Gas chromatography-mass spectrometry (GC-MS) is probably the most widespread tandem technique in the analytical instrumentation industry today. GC-MS systems are versatile and are employed across many different industries, particularly for environmental, chemical, petroleum, pharmaceutical, and toxicological applications.

While GC-MS is a fast, sensitive technique suitable for multiple component detection and spectral identification, capable of measuring atomic species and supported by large available spectral libraries, it suffers from many disadvantages. These include compound separation to prevent MS interferences, non-linear calibrations, poor precision and accuracy (requiring constant calibration) and limited dynamic range. Problems also are encountered when high concentrations are present that can allow for chemical ionization to occur, generating questionable data.

While GC-MS is the more commonly deployed solution, Gas Chromatography-Fourier Transform Infrared Spectrometry (GC-FTIR) provides a powerful analytical tool that is particularly useful to distinguish among structural isomers that have identical electron impact and chemical ionization mass spectra.

Nevertheless, historically the designs of GC-FTIR systems have been plagued with their own limitations. For example, many GC-FTIR sample cells utilize a "light pipe" (typically a cell or cuvette used for passing both gas eluted from the GC column, and light from the FTIR interferometer). The light pipe is made relatively short to prevent peak dilution through the IR cell and its eventual IR detection or secondary detection. Since IR absorption is proportional to cell path length, this short path length limits the sensitivity (minimum detection limit (MDL)) of the technique. Problems also arise in cases in which GC peaks come off very quickly. Since the light pipe has a relatively large volume when compared to the flow rates of the GC, the gas can become diluted, making measurements more difficult.

More recently in U.S. Pat. Appl. Pub. No. US 2015-0260695 A1, by Spartz, et al., GC-FTIR techniques and systems were disclosed. (U.S. Pat. Appl. Pub. No. US 2015-0260695 A1 is incorporated herein by this reference in its entirety.) The general objective was to couple existing or newly developed systems, such as GCs, and/or optical spectroscopy systems, such as FTIRs, in ways that reduce or minimize the deficiencies encountered with conventional arrangements. In general, the sample was directed from a temporally-resolving separator to a sample cell, e.g., a gas cell that fully or partially integrates the components provided by the separator. Typically, the sample cell was partially or fully evacuated. Fluids, e.g., gas(es), were allowed to accumulate in the sample cell, effectively integrating their spectral signatures. Multiple spectra obtained over a time interval could then be averaged to best measure the integrated concentration in the sample cell. Obtaining a moving background that includes spectra from a previously eluted sample component, e.g., previously eluted chemical species, allowed for the analysis of the current eluting components without interference from previously eluted components. The integrated and averaged multiple spectra were corrected by using a similarly collected moving background, and the corrected data are compared to known spectra to identify one or more components, e.g., chemical species such as atoms, molecules, molecular fragments, ions, present in the sample component.

SUMMARY OF THE INVENTION

With continued advances in the spectrometry systems, and specifically the software that is used to identify the eluted chemical species from their spectral signatures, it is noted that fully or nearly fully resolved GC peaks and/or a certain amount of co-elution can be tolerated. As a result, for some applications, the full capabilities of the GC are not required to discriminate or resolve species in time. For some applications, a slowly ramped thermal desorption tube may provide adequate temporal separation of the components of the sample.

In general, according to one aspect, the invention features a sample analysis system. This system comprises a thermal desorption separator that provides components of a sample over time, a sample cell in which the components are partially or fully integrated, e.g., collected and accumulated, and a spectrometry system for obtaining a spectral response of the components in the sample cell.

According to another aspect, the invention features a sample analysis method. The method includes desorbing components in a sample collected in a thermal desorption separator, wherein the desorbed components are separated or partially separated temporally, directing the desorbed components to a sample cell, allowing the components in the sample cell to become at least partially integrated, and obtaining a spectral response of the components in the sample cell.

In different implementations, the spectrometry system determines the spectral response of the components in the sample cell in one or more of the following spectral regions millimeter, microwave, terahertz, infrared (including near-, mid- and/or far-infrared), visible, ultraviolet (UV) (including vacuum ultraviolet (VUV)), x-rays and/or gamma. Further, the spectrometry system can measure different characteristics, such as absorption spectra, emission (including blackbody or fluorescence) spectra, elastic scattering and reflection spectra, impedance (e.g., index of refraction) spectra, and/or inelastic scattering (e.g., Raman and Compton scattering) spectra of the components in the sample cell.

In one embodiment, the spectrometry system is a Fourier transform infrared spectrometer.

Preferably, a path length in the sample cell is increased by a multiple path optical arrangement. A White cell or modified White cell type optical arrangement can be used. Usually, the sample cell is at least partially evacuated.

In other embodiments a flow cell is used. Preferably the flow cell specifications are selected based upon the flow rate and the temperature ramp profile applied to the thermal desorption separator to ensure that individual species are partially or fully integrated in the cell before flowing out.

Embodiments can include a vacuum pumping device for evacuating or partially evacuating the sample cell or pulling the sample through the sample cell. Further, a valve for isolating the sample cell from a pumping device, a valve for diverting output from the separator away from the sample cell, a sample cell pressure control, or any combination thereof can be used.

Practicing the invention can have many advantages. In some of its aspects, the system and method described herein can be used to detect any optically, such as IR, active vapor or gas. Many spectral resolutions are available depending on the specific application, and the technique can measure organics, inorganics, polar or non-polar compounds, acids and bases on the same system. Low molecular to very high molecular weight compounds can be detected and approaches described herein can be particularly useful in analyzing semi-volatile organic compounds (SVOCs). In some of its aspects, the invention makes possible measuring the source directly.

In comparison to GC-MS, full spectral identification and quantification are possible, including the capability of measuring isotopes or structural isomers. Information about chemical functionalities (e.g., alcohol, ester, ether, ketone, acid, amine, halogen presence, and so forth) present also can be obtained. This system can measure or deconvolve many compounds that co-elute. 20+ compounds have been demonstrated but more are certainly possible with advanced analysis algorithms. Significantly, inorganic gases that are not retained by the GC column can be measured simultaneously and without interference. Overlapping compounds also can be measured because interferences can be removed (blended into the background spectrum) as a run progresses.

In many cases, full resolution of peaks generated by the thermal desorption separator, a thermal desorption tube (TDT), for instance, is not required. Thus, in comparison to GC-FTIR, detection and analysis according to embodiments described herein can be conducted in the absence of a separation GC column, streamlining the equipment and other requirements associated with operating GC-FTIR instrumentation.

Techniques described herein are particularly well suited in closed process systems and, in particular, in situations that require a rapid analysis of a stream containing a limited number (e.g., 20 to 30) of compounds to be detected. Advantageously, such situations can be handled by setting all parameters for these compounds and allowing the parameters to repeat.

Other advantages relate to the moving background described herein, since any change in the spectrometer response, possible especially during a long run, is removed. Without this feature, a baseline change that is in any way not a linear change affects the detection of low level compounds since the peak would be less than the compound peak size. Thus late eluters would be compared to a background that is moving around and changing and since late eluters are diffusing in the sample (gas) cell, the peak will be drawn out, giving the appearance of a baseline shift at long times. These two issues are addressed by the integration and background shifting disclosed herein.

The above and other features of the invention including various details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 2A is a schematic plot of temperature of the thermal desorption separator and the concentrations of the components flowing from the thermal desorption separator as a function of time for a linear temperature profile.

FIG. 2B is a schematic plot of temperature of the thermal desorption separator and the concentrations of the components flowing from the thermal desorption separator as a function of time for a stepped profile temperature ramp according to another embodiment.

DETAILED DESCRIPTION OF THE PREFERRED EMBODIMENTS

Figure 1:
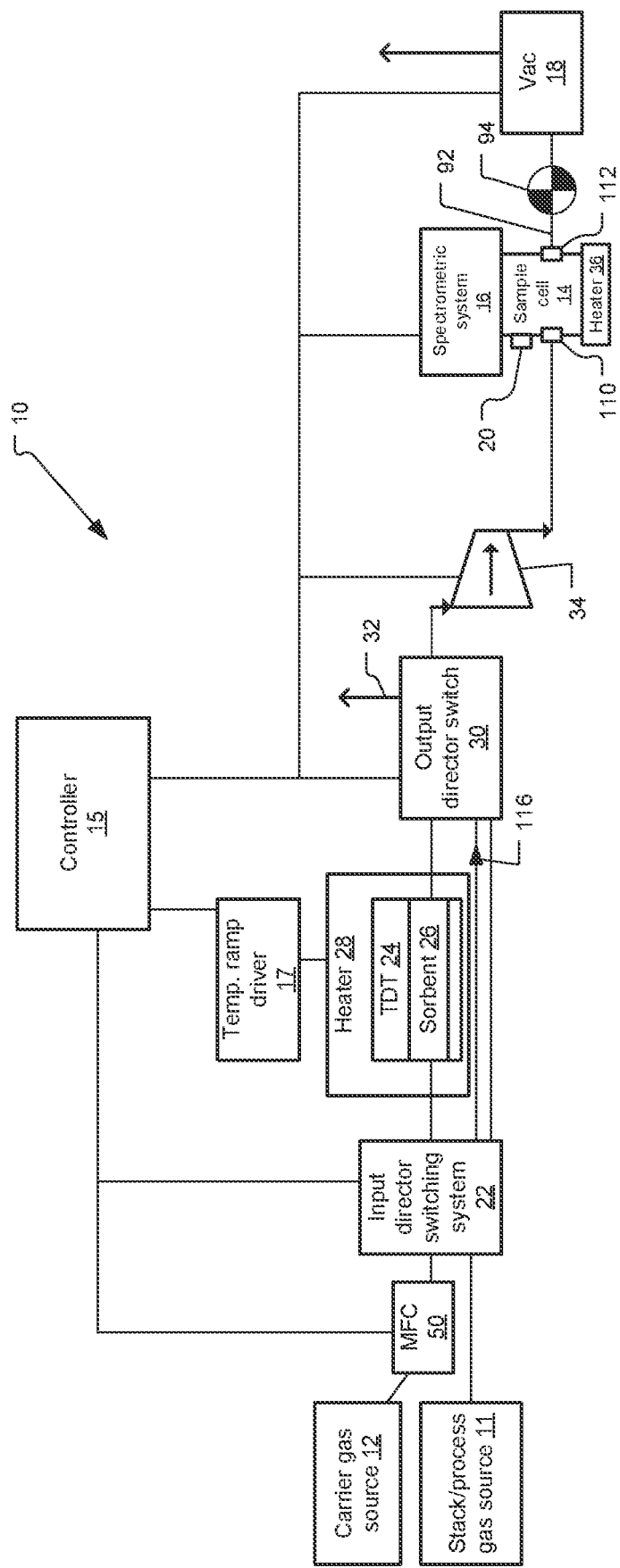
FIG. 1 is a schematic diagram of a sample analysis system according to embodiments of the invention.

FIG. 1 shows a system 10 including a thermal desorption tube 24, a sample cell 14, and a spectrometry system 16. In comparison to some of the embodiments described in U.S. Patent Application Publication No. US 2015/0260695 A1 by Spartz, et al., now U.S. Pat. No. 9,606,088, issued Mar. 28, 2017, both of which are incorporated herein by this reference in their entirety, no GC separation column is employed.

The thermal desorption tube 24 is used to concentrate volatile organic compounds (VOCs) and/or other compounds from gas streams. In the illustrated embodiment, streams such as stack and/or process gas 11 are sampled.

Gas from the source 11 is circulated through the tube 24 via an input director 22. Compounds in the gas are retained and collected onto a sorbent 26 contained in the tube 24. The gas exiting the tube travels to the output director switch 30 and is typically vented via port 32.

Alternatively, the sample can be introduced into TDT 24 via an injection arrangement such as a direct injection port, or static or flow-through configuration.

In some embodiments, the TDT 24 is a single stage device. The compounds are retained on the sorbent 26 and then released by heating the tube 24 and the sorbent 26.

For this purpose, the tube 24 is located within an oven heater 28 or it can be transferred to the heater 28. In either case, this sorbent 26, in a flow of gas, such as nitrogen carrier gas from source 12, can release the compounds and concentrate them into a smaller volume.

In other embodiments, TDT 24 is a two stage device. Here also, compounds are retained on the sorbent 26. Then the compounds are transferred to a focusing trap or cold or cryo trap (not shown in the drawing). This trap is held at or below room temperature, such as 0-10° C. Then, this trap is heated by the oven heater 28 to release the sorbed components.

The tube 24 and/or the focusing trap are preferably packed with one or more sorbents. The type and number of sorbents depends the expected analytes. One example is poly(2,6-diphenyl-p-phenylene oxide). Other possible examples are silica gel, zeolites, activated carbon, graphite, to provide other examples.

In other embodiments, a separate capturing system is used. Specifically, the thermal desorption tube TDT 24 is installed in a capturing system and then deployed in the field to a location where the gas sample is to be obtained. Then, once the samples have been acquired, the tube 24 is transferred to the heater 28 for subsequent desorption, possibly in a laboratory environment.

During the desorption process, the direction of gas flow is typically reversed in the TDT 24. The output director switch 30 directs the gas flowing (116) from the TDT 24 to the sample cell 14. The spectrometric system 16 then analyzes the spectral response of the components contained within the sample cell 14.

For this stage, carrier gases can be employed. In one example, the input director 22 is controlled by the controller 15 to switch in a carrier gas source 12 providing nitrogen ($N_2$), ultra high purity (UHP) $N_2$, or another suitable gas or gas mixture, e.g., as known in the art.

The spectrometry system 16, e.g., FTIR spectrometer, includes a light, or more generally an electromagnetic radiation, source. In specific implementations, FTIR spectrometry system 16 is a commercially available instrument. The infrared radiation (light) generated by its source and modified according to the principles of Fourier transform spectrometry, using typically a Michelson interferometer, is directed to the sample cell 100. From the sample cell 100, output radiation is directed to an IR detector, usually a mercury cadmium telluride (MCT) detector.

Specific examples of IR detectors employ liquid nitrogen ($LN_2$) cooled MCTs. A suitable detector for a broad spectral analysis capability can be a 1 mm mid-band MCT with a cutoff of 16 µm. 0.25 mm to 0.5 mm mid band detectors, 22 to 16 µm detector cutoffs also can be used, typically for broad analysis, while 7 to 5 µm detector cutoffs can be selected for more specialized analyses to even lower MDLs. Numerous other detectors could be utilized. Examples include but are not limited to, InSb, InSb/MCT two color detectors, silicon, InGaAs, AlInGaAs, PbS, PbSe, Ge, TGS, DTGS, $LiTaO_3$. Different cooling technologies can be utilized for the detectors such as thermoelectric (TE), e.g., Peltier, Stirling, $LN_2$, or liquid He.

A very narrow band MCT detector can be employed in some situations, offering about an order of magnitude improvements in sensitivity. Currently, very narrow band MCT detectors are only operational in the 1-5 µm range. This range covers the C—H and O—H stretching region. While hydrocarbon identification is typically based on the 5-20 µm fingerprint region, there appears to be enough variation along with a certain degree of temporal separation to make feasible hydrocarbon specification using the 1-5 µm range, at least for some applications. As an added advantage, very narrow band MCT detectors can run thermoelectrically- or TE-cooled as compared to $LN_2$ cooled.

$LN_2$ is not always required with other types of detectors, e.g., if DTGS (deuterated triglycine sulfate) detectors are employed, for continuous operation, for example.

Typically output from the tube 24 is in a gaseous state, containing one or more gases and/or vapors. This output is directed to sample (also referred to herein as gas) cell 14 via its inlet port 110. The cell 14 is typically a flow cell or a vessel that can be evacuated and configured to maintain a gas pressure lower than the surrounding (atmospheric or ambient) pressure and integrate the gases from the TDT.

In specific implementations of the integrating cell, the pressure in the sample cell is within the range of about 0.001 to about 1.0 atm. For instance, a flow rate of 1 mL/minute, a sample cell volume of 200 mL and a starting gas cell pressure of ½ atmosphere can provide a 100 minute time period for data acquisition. This is considered to be a sufficient time window for some analyses.

In specific examples, sample cell 14 is heated with a heater 36. This feature is particularly useful when analyzing gases with varying vapor pressures or boiling points, e.g., when measuring semi-volatile or even nearly non-volatile compounds. In examples, the heater 36 for heating sample cell 14 is, but is not limited to, heating tape, heating jackets, ovens, Peltier heaters/coolers, cartridge, immersion, and so forth.

The pressure in the sample cell is reduced with the help of vacuum pump 18, e.g., a traditional foreline oil pump, a diaphragm pump or another suitable pump or alternative apparatus capable of drawing a vacuum. The pressure in the sample cell can be monitored with a sensor, such as, for instance, absolute pressure sensor 20.

In some cases, no vacuum is required and the system can be operated at a suitable pressure. For instance, a compressor 34 be used to compress the output from the TDT 24 into the sample cell 14. Preferably, over pressurizing is typically avoided, however.

Sample cell 14 also receives electromagnetic radiation, light for instance, from the spectrometry system 16.

Typically, the cell 14 is provided with optical components, such as, for example, windows, that allow transmission of an electromagnetic radiation beam within a desired wavelength (or frequency) range. Examples of suitable materials that can transmit IR include potassium bromide (KBr), potassium chloride (KCl), cesium iodide (CsI), barium fluoride ($BaF_2$), sodium chloride (NaCl), calcium fluoride ($CaF_2$), magnesium fluoride ($MgF_2$), zinc selenide (ZnSe), zinc sulfide (ZnS), thallium bromoiodide (KRS-5), silver chloride (AgCl), silver bromide (AgBr), lithium fluoride (LiF), sapphire, diamond, silicon, germanium, fused silica, AMTIR-1 ($Ge_{33}AS_{12}Se_{55}$) and various silicon, cadmium, selenium and germanium based glasses and many others, as known in the art.

Sample cell 14 can be configured for multiple-path (also known as multiple-pass or long path) absorption. By increasing the path length traveled, multiple-pass arrangements can be used to measure low concentration components or to observe weak absorption spectral features without increasing the physical length or volume of the cell itself. Since the detection limit of the system is directly related to the volume/path length ratio, decreasing the volume or increasing the path length lowers the concentrations that can be detected. Assuming no signal losses, doubling the path length or reducing the volume in half will lower the MDL by a factor of 2.

In certain embodiments, longer path lengths are used in combination with higher reflective coatings like enhanced silver, yielding a reflectivity in the 0.992 to 0.995 range or greater. Coating optimizations, in the IR region, for example, could further improve reflectivity, e.g., by a factor or 4 to 8 or even more.

In specific implementations, sample cell 14 can be configured as a "White cell" type. In a traditional White cell arrangement, three spherical concave mirrors are employed having the same radius of curvature. Second generation multiple-path gas cells can use non-spherical concave mirrors to improve image quality and optical throughput. The White is common when an integrating cell is used In specific examples, the modified White cell employed in system 10 is a fixed path cell, with no adjustment for path length. Such a design reduces the number of variables to be monitored and/or controlled. In one instance, the White type cell has a volume of ~200 mL. Using gold mirrors can produce a path length of about 5.11 meters (m), while enhanced silver mirrors can result in path lengths of 10 m or much longer. This increase in path length and change from gold to silver improves the throughput of the gas cell and provides an approximate doubling or more of the absorption signal which further reduces the analyte MDLs.

In many implementations, the White cell utilized, e.g., a second generation White cell, is heated, for example to a temperature such as 150° C., 200° C., 250° C., 300° C. or higher, facilitating the use of the gas cell to analyze samples with varying vapor pressures or boiling points, e.g., to measure semi-volatile or even nearly non-volatile compounds.

In fact, aspects of the invention are particularly well suited for analyzing semi-volatile or nearly non-volatile organic compounds. In one example, TDT 24 is utilized to collect a sample containing volatile organic compounds (VOCs), water and semi-volatile organic compounds (SVOCs). The desorption process is then conducted by burning off the first two, then focusing the analysis on the heavier components (e.g., the SVOCs), using a programmed approach.

As described above, suitable types of heaters 36 include but are not limited to heating tape, heating jackets, ovens, Peltier heaters, cartridge heaters, immersion heaters, and so forth.

Other multiple pass cell designs can be utilized. Examples include but are not limited to Herriott cells, Pfund cells, cavity-ring down cells, and integrating spheres.

A lightpipe flow sample cell often utilized in the flow cell implementations. Preferably the residence time of the compounds in the flow cell is similar to the length of time chemicals elute from the TDT 24.

One or more valves 94 can be disposed between pump 18 and the exhaust port 112 of the sample cell 14. The valve system can fully open the sample cell 14 to the vacuum pump 18 or can open and close to moderate the sample cell pressure to a desired level. Fluid flow-through the sample cell can be monitored and/or adjusted, for example with one or more mass flow controllers (MFC). In the illustrated embodiment, a MFC 50 is located in-line between the carrier gas source 12 and the TDT 24. In the illustrated implementation, MFC 50 controls the flow of effluent from the TDT 24 into the gas cell 14 by controlling the flow of carrier gas into the TDT 24.

The controller 15 preferably includes electronics, computer systems, video displays, devices, units, interfaces and/or other components for data processing, analysis (including multivariate qualitative and quantitative), recording, reporting, equipment controls, automation, flow control and controllers, pressure sensors and controllers, heaters and temperature controllers, valves and vacuum generation technology, spectral libraries, and so forth.

During desorption, a temperature ramp is applied to the tube 24. In one example, a temperature ramp driver 17 drives the heater 28 based on a temperature-time profile dictated by the controller 15.

The gas flowing from the tube 24 is captured in sample cell 14 for a specific time, based on the gas turnover rate or residence time in the sample cell. Various flow conditions can be employed. In a transient mode, for instance, the entire experiment (run) is conducted under a set, i.e., unchanging pressure, e.g., under a set vacuum pressure. In a full integration mode, sample cell 14 is evacuated and the sample is allowed to accumulate in the sample cell, with the pressure changing throughout the analysis. In a flow mode, the sample continuously flows through the sample cell 14 and the residence time is tuned to a period in which components will be largely or completely integrated in the cell before flowing out. Also possible is a partial integration mode, where the sample cell is evacuated to a set pressure and a dilution gas is added and maintained in the cell for a period of time, e.g., 1 minute. Other operating modes can be employed, such as, for example, a mode that reduces the size of the data set, as described herein.

In some arrangements, a continuous carrier gas flow of $N_2$ (or other carrier gas) is directed through the TDT 24 from the source 12 and into the sample cell 14.

In yet other arrangements, the carrier gas, e.g., $N_2$, or the sample from the TDT 24 can be diverted to a secondary pumping service to prevent spectral interference from large concentration compounds such as solvent species. The flow can then be switched for sample collection.

If sample cell 14 is initially evacuated, then sealed from pump 18, the carrier gas and sample components from the TDT 24 can accumulate in the sample cell 14 and spectra can be obtained during the entire data collection. The chemicals are captured in the sample cell, the entire amount of each gas (compound) can be measured once it has completely eluted or desorbed from the TDT 24. Since the gas cell is a multiple pass gas cell in a preferred embodiment, there can be an increased absorption for each component.

To improve the analysis/analyzer specificity, the background spectrum will change with time. Initial background spectra will be acquired prior to sample elution, then as time goes on, the background spectrum will be created from previous sample spectra (average of sample spectra) collected prior to the current sample spectra and compound elution. By moving the background spectrum in time, all compounds in the gas cell prior to the current background no longer will exhibit spectral features in the absorbance spectrum. The closer in time this dynamic background is to the current spectra, the more reduced the chance that any previously eluted or desorbed compounds will affect the current measurement. This moving background will allow for the measurement of trace compounds in the presence of very high concentrations as long as the compounds are separated in time. The time separation between the sample and background points could be constant or variable, depending on the width of the peak. If long separation times are required for an analysis, both the separation between the two spectra could increase with time.

The amount of averaging for background and sample spectral file can be application dependent, for instance 1 minute. The averaging could be increased over the course of the run, however.

The carrier gas flow can be interrupted for stop-flow measuring. In some instances, this may require user monitoring, e.g., by the operator or performed automatically by the controller 15. It is believed that this approach presents particular benefits for the full integration mode, since even longer averages of spectra can be obtained. In one example, the flow into the sample cell is stopped by the mass flow controller 50. Then, at specified intervals, e.g., every 30 or 60 seconds, the mass flow controller 50 opens briefly, for 10 seconds, for example, to dump the next plug of gas into the sample cell 14.

In another approach, stopping the flow of carrier gas is also possible, using a suitable arrangement of flow controllers described previously.

Various steps in the method described herein can be conducted manually. In specific embodiments, at least one and preferably more or even all activities are automated and performed by the controller 15 that can be connected to or integrated with system 10 or one or more of its components. In specific implementations, the controller 15 is connected to or integrated with the FTIR spectrometer 16. In specific examples, the controller 15 monitors and/or controls the pressure in the sample cell 14. It preferably controls the operation of the vacuum pump 18 and various valves 94 and the mass flow controller 50, in addition to the input director 22 and the output director 30. The controller 15 further preferably monitors the pressure detected by the pressure sensor 20 and/or the output of other sensors/transducers. In specific examples, the controller 15 accesses internal or external libraries, and/or other devices or sources needed for data collection and analysis.

In one mode of operation, the temperature ramp profile applied by the driver 17 to the heater 28 is optimized based on the flow characteristics of the sample cell 14 and the operation of the spectrometry system 16.

FIG. 2A shows one (linear) temperature ramp 205 applied to the tube 24. The temperature of the tube 24 is linearly increased by applying the temperature ramp to the heater 28. Also schematically shown are the concentration peaks 210-1 to 210-4 of different components flowing from the tube 24 during the ramp as the temperature of the tube 24 reaches the temperatures of elution or desorption (BP #1-BP #4) of the different components (Component #1-Component #4) of the sample.

In general, the ramp and the flow-rate through the cell 14 should be specified and designed so that entire peaks are integrated within the cell 14, before they start to flow out. Here, the residence for gas in the sample cell 14 is adjusted and/or designed to be at least equal to the time required for peaks 210-1 to 210-4 of the different components of the sample to flow from the tube 24 based on the temperature ramp profile applied to the tube 24 by the controller 15.

FIG. 2B shows a stepped profile temperature ramp 205-1 applied to the tube 24 according to another embodiment. Here, the temperature of the tube 24 is increased in steps. The level of each temperature plateau is set, in one mode of operation, so that the plateaus are evenly spaced in temperature. In another mode, the temperature plateaus 212-1-212-4 are set to the temperatures at which the different components elute or desorb from the tube (BP #1-BP #4) of expected components (Component #1-Component #4) within the sample. These desorption temperatures in examples are the boiling points of the respective components, temperatures slightly above the boiling points. Often, the components begin to desorb below their boiling points, however. Further, the length of the plateaus in time is set to be long enough for all of the corresponding components to desorb or boil-off of the tube 24. As a result, some plateaus are longer than others.

In still another embodiment, the feedback control is employed. In more detail, the controller 15 controls the temperature ramp driver 17 to slowly raise the temperature of the TDT 24 while monitoring the spectral response of the sample in the sample cell 14 via the spectrometric system 16. Once the spectral response begins to change as a result of a component beginning to leave the tube 24, the controller 15 controls the driver 17 to hold the temperature of the TDT 24 until that component in no longer being detected or no component appears to be leaving the tube 24. Then, the controller begins slowly ramping the temperature again until the next component is detected in the sample cell 14. This process is repeated until all components in the tube 24 have flowed through the cell 14 or have been integrated into the cell 14 and have been thus analyzed.

In general, during operation, the transfer lines and any components between the tube 24 and the sample cell 14 should be heated and held at a high temperature. Normally the transfer lines and the cell 14 will be set at a single temperature, such as higher than 100° C., such as 150° C., 200° C., 250° C., 300° C. or higher. The desorption tube 24 could potentially be hotter but that is just to release the compound from the sorbent.

Figure 3:
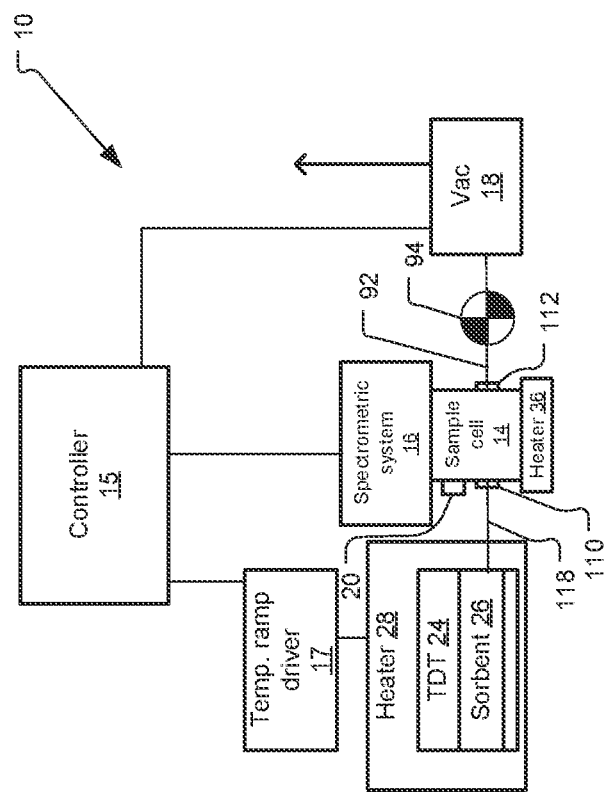
FIG. 3 is a schematic diagram of a sample analysis system according to another embodiment of the invention in which the thermal desorption tube is directly connected to the sample cell.

FIG. 3 shows another embodiment of the system 10 including a thermal desorption tube 24, a sample cell 14, and a spectrometry system 16. This embodiment can be operated as described above, but the TDT tube 26 is connected directly to the gas cell inlet port 110. As a result, the line 118 between the TDT 24 and the inlet port 110 is reduced or minimized and is typically short, such as less than 30 centimeters (cm), or less, than 20 cm, 10 cm, 5 cm or is even 0 cm (i.e., direct connection between the TDT tube 26 and the sample cell 14. In other examples, however, a valve, such as an on-off valve is located on the short line 118 between the TDT 24 and the sample cell 14).

There are potential advantages to this embodiment. In some modes of operation, purge or carrier gas is not used or very little is used. The components from the tube 24 off-gas into the vacuum or lower pressure of the gas cell 14.

While this invention has been particularly shown and described with references to preferred embodiments thereof, it will be understood by those skilled in the art that various changes in form and details may be made therein without departing from the scope of the invention encompassed by the appended claims.

What is claimed is:

1. A sample analysis system, comprising:
   a thermal desorption separator that provides components of a sample over time;
   a sample cell in which the components are at least partially integrated;
   a Fourier transform infrared spectrometry system for obtaining a spectral response of the components in the sample cell;
   a temperature ramp driver and a heater for raising the temperature of the thermal desorption separator over time to release components that are separated or partially separated temporally.

2. The system of claim 1, wherein a temperature ramp profile applied by the driver to the heater is optimized based on the flow characteristics of the sample cell and an operation of the spectrometry system.

3. The system of claim 1, further comprising a sample cell heater.

4. The system of claim 1, further comprising an output director switch for drawing vapors from the thermal desorption separator into the sample cell.

5. The system of claim 1, further comprising one or more of: a carrier gas source, an input director switch, valves, flow controllers, vacuum pump, or pressure monitors.

6. The system of claim 1, wherein the sample cell is a multiple path cell.

7. The system of claim 1, wherein the thermal desorption separator is a two-stage device including a thermal desorption tube and a focusing trap.

8. The system of claim 1, wherein the sample cell is a flow cell in which a residence time of compounds in the flow cell is similar to a length of time chemicals elute from the thermal desorption separator.

9. The system of claim 1, wherein the system does not include a gas chromatography separation column.

10. The system of claim 1, wherein a distance between the thermal desorption separator and the sample cell is minimized.

11. A sample analysis method, comprising:
   desorbing components in a sample collected in a thermal desorption separator, wherein the desorbed components are separated or partially separated temporally using a temperature ramp driver and a heater for raising the temperature of the thermal desorption separator to release components;
   directing the desorbed components to a sample cell;
   allowing the components in the sample cell to become at least partially integrated; and
   obtaining a spectral response of the components in the sample cell with a Fourier transform infrared spectrometry system.

12. The method of claim 11, wherein the temporally separated components are generated by ramping the temperature of the thermal desorption separator in a linear or step-wise mode by operation of the temperature ramp driver and the heater.

13. The method of claim 11, wherein the sample components are desorbed temporally according to their boiling points.

14. The method of claim 11, wherein the desorbed components are not passed through a gas chromatography separation column.

15. The method of claim 11, further comprising heating the sample cell.

16. The method of claim 11, further comprising passing a carrier gas through the thermal desorption separator.

17. The method of claim 11, wherein no carrier gas is passed through the thermal desorption separator.

18. The method of claim 11, wherein the sample contains volatile organic compounds, semi-volatile organic compounds and/or nearly non-volatile organic compounds.

19. The method of claim 11, wherein the sample cell is a flow cell in which a residence time of compounds in the flow cell is similar to a length of time chemicals elute from the thermal desorption separator.

20. The method of claim 11, wherein the sample cell is operated in a flow-through mode or is sealed to allow components to accumulate in the sample cell.

21. The method of claim 11, wherein the path length in the sample cell is increased by a multiple path optical arrangement.

22. The method of claim 11, wherein the components in the sample cell are identified by periodically determining spectral responses of the components in the sample cell and using some of the spectral responses as backgrounds to analyze more recent spectral responses.

23. A sample analysis system, comprising:
   a thermal desorption separator that provides multiple components of a sample to a sample cell over time;
   a temperature ramp driver and a heater for raising the temperature of the thermal desorption separator over time to release components that are separated or partially separated, wherein components with different boiling points are released to the sample cell at different time; and
   a Fourier transform infrared spectrometry system for obtaining a spectral response of the components that are at least partially integrated in the sample cell.

24. The system of claim 23, wherein a temperature ramp profile applied by the driver to the heater is optimized based on the flow characteristics of the sample cell and an operation of the spectrometry system.

25. The system of claim 23, wherein the thermal desorption separator is a two-stage device including a thermal desorption tube and a focusing trap.

26. The system of claim 23, wherein the sample cell is a flow cell in which a residence time of compounds in the flow cell is similar to a length of time chemicals elute from the thermal desorption separator.

27. A sample analysis method, comprising:
   temporally desorbing multiple components in a sample collected in a thermal desorption separator, wherein the components are separated or partially separated by raising the temperature of the thermal desorption separator according to a temperature ramp profile;
   releasing the desorbed components to a sample cell, wherein components with different boiling points are released at different time;
   allowing the components in the sample cell to become at least partially integrated; and
   obtaining a spectral response of the components in the sample cell with a Fourier transform infrared spectrometry system.

* * * * *